United States Patent [19]

Manner

[11] 3,985,720

[45] Oct. 12, 1976

[54] POLYMERIZATION OF ETHYLENICALLY UNSATURATED MONOMER EMPLOYING A CATALYST SYSTEM COMPRISING DIALKYLPYROCARBONATE, ORGANIC ACID ANHYDRIDE, ALKALINE REAGENT AND $H_2O_2$

[75] Inventor: James A. Manner, Akron, Ohio

[73] Assignee: PPG Industries, Inc., Pittsburgh, Pa.

[22] Filed: May 30, 1975

[21] Appl. No.: 582,499

[52] U.S. Cl. .............................. 526/220; 260/63 R; 260/750 A; 260/78.41; 526/227; 526/230; 260/861; 260/862; 260/DIG. 28

[51] Int. Cl.² ............... C08F 114/02; C08F 114/16; C08G 2/00; C08G 63/12

[58] Field of Search ............... 260/92.8 R, 92.8 W, 260/463, 63 R, 750 A, 78.4 R, 78.4 E, 78.4 UA, 80 C, 80.3 R, 80.72, 80.73, 80.76, 80.77, 80.78, 80.8, 80.81, 85.5 N, 86.1 E, 86.1 R, 86.3, 87.5 A, 87.5 C, 87.5 E; 260/88.3 R, 88.1 P, 88.1 PN, 88.1 PC, 88.2 R, 88.2 B, 88.7 D, 89.3, 89.5 A, 89.5 AW, 89.7 R, 93.5 S, 91.5, 93.5 W, 92.1, 861, 862, DIG. 28

[56] References Cited
UNITED STATES PATENTS

| | | | |
|---|---|---|---|
| 3,022,281 | 2/1962 | Smith | 260/92.8 W |
| 3,108,093 | 10/1963 | Pajaczkowski et al. | 260/89.5 |
| 3,326,958 | 6/1967 | Curtius et al. | 260/476 R |
| 3,420,807 | 1/1969 | Harrison et al. | 260/92.8 R |
| 3,575,945 | 4/1971 | Cantoni et al. | 260/92.8 W |
| 3,580,955 | 5/1971 | Bafford | 260/610 B |
| 3,637,633 | 1/1972 | Dixon et al. | 260/92.8 W |
| 3,821,273 | 6/1974 | D'Angelo | 260/463 |
| 3,857,828 | 12/1974 | Sanchez | 260/92.8 W |
| R25,763 | 4/1965 | Marous et al. | 260/92.8 W |

Primary Examiner—Joseph L. Schofer
Assistant Examiner—Herbert J. Lilling
Attorney, Agent, or Firm—Irwin M. Stein

[57] ABSTRACT

Ethylenically unsaturated material susceptible to free-radical polymerization, e.g., vinyl chloride monomer, is polymerized, e.g., in an aqueous medium, with an initiator system comprising, in combination, alkaline reagent, e.g., sodium bicarbonate, organic acid anhydride, e.g., isobutyric anhydride, peroxygen compound selected from organic peroxy acid (peracid), e.g., peracetic acid, and hydrogen peroxide, and alkyl pyrocarbonate, e.g., diethyl pyrocarbonate. The initiator system is added to the polymerization medium in amounts sufficient to polymerize the ethylenically unsaturated material.

28 Claims, No Drawings

POLYMERIZATION OF ETHYLENICALLY UNSATURATED MONOMER EMPLOYING A CATALYST SYSTEM COMPRISING DIALKYLPYROCARBONATE, ORGANIC ACID ANHYDRIDE, ALKALINE REAGENT AND $H_2O_2$

DESCRIPTION OF THE INVENTION

The polymerization of ethylenically unsaturated materials susceptible to free-radical polymerization, e.g., unsaturated vinyl-type monomers, such as vinyl chloride, with organic peroxide initiators is well recorded in the literature and has found extensive commercial application. Commercially available organic peroxides, while widely used as polymerization initiators, have limited versatility because their rate of decomposition at a particular temperature is fixed and because the temperature at which the polymerization is conducted affects the properties of the polymer product produced. Thus, for optimum results, the rate of decomposition of the initiator at the polymerization temperature should be such that the polymerization can be conducted at a useful rate. It is, of course, axiomatic that organic peroxide initiators are relatively unstable compounds and that their instability increases with their reactivity. Highly reactive organic peroxides have the disadvantage of decomposing, often rapidly, at room temperature.

Among the organic peroxides suggested for use as initiators for the aforementioned monomeric materials are dialkyl peroxydicarbonates. The lower dialkyl peroxydicarbonates, e.g., $C_2 - C_8$ dialkyl peroxydicarbonates, have been found most suitable for use as initiators at the polymerization temperatures conventionally used, i.e., between 45° C. and 80° C., e.g., 45°–55° C. Lower dialkyl peroxydicarbonates, e.g., diethyl peroxydicarbonate and diisopropyl peroxydicarbonate, are, when undiluted (neat), more unstable than the higher dialkyl peroxydicarbonates, some of which are solids. Therefore, the preparation, transportation, storage and use in commercial polymerization facilities of the lower dialkyl peroxydicarbonates requires special precautions and handling procedures. For example, such initiators are usually shipped and stored under refrigeration. The aforesaid special precautions and handling procedures may have inhibited some from taking full advantage of the benefits offered by their use.

It has been suggested that diethyl peroxydicarbonate be produced in situ in a polymerization medium containing an alkaline aqueous phase and a monomer phase by the reaction of an alkyl haloformate and hydrogen peroxide. See, for example, U.S. Pat. No. 3,022,281 and U.S. Pat. No. 3,575,945. In the former, it is suggested that the alkyl haloformate be present in the monomer phase and the hydrogen peroxide be present in the alkaline water phase, thereby forming dialkyl peroxydicarbonate at the interface of the two phases. The aforementioned process for preparing dialkyl peroxydicarbonate in situ from several disadvantages. First, the alkyl haloformate, e.g., ethyl chloroformate, is a lachrymator. Further, the use of the alkyl haloformate results in the formation of a hydrogen halide by-product, which can be corrosive to the equipment used in the polymerization. Finally, the combined presence of the hydrogen halide by-product and alkaline reagent, e.g., sodium hydroxide or sodium bicarbonate, results in the formation of a halide salt e.g., sodium chloride which may be present in the polymer product and, which when present even at low levels, must be removed by extensive washing of the polymer.

It has now been discovered that some of the difficulties associated with the use of organic peroxides as free-radical initiators for the polymerization of ethylenically unsaturated materials can be eliminated by the use of a novel initiator system. More particularly, it has been discovered that the use, in combination, of organic acid anhydride, peroxygen compound selected from the group consisting of an organic peroxy acid (peracid) and hydrogen peroxide, dialkyl pyrocarbonate and an alkaline reagent can effect the polymerization of ethylenically unsaturated materials charged to a polymerization vessel. The aforementioned reactants are introduced into the polymerization medium where, in the presence of the ethylenically unsaturated material, they form in situ the initiator(s) that initiate the polymerization reaction. The pyrocarbonate is not a lachrymator. Indeed, the lower alkyl pyrocarbonates, e.g., diethyl pyrocarbonate, have a sweet, ester-like odor. By-products from the use of dialkyl pyrocarbonates are carbon dioxide or carbonation by-products, e.g., sodium bicarbonate (a salt that can be used as an alkaline buffering reagent in the polymerization recipe) and an alkanol. The present invention, therefore, provides a novel means for preparing dialkyl peroxydicarbonates in situ in the polymerization medium without the disadvantages previously described for the initiator system described in U.S. Pat. No. 3,022,281.

DETAILED DESCRIPTION

Dialkyl pyrocarbonates useful in the practice of the present process can be represented by the general formula,

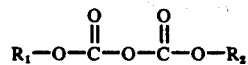

I.

wherein $R_1$ and $R_2$ are each selected from the group consisting of $C_1 - C_{20}$ alkyl and alkenyl, $C_6 - C_{12}$ cycloalkyl, $C_7 - C_{10}$ aralkyl having a single aromatic ring, and $C_6 - C_8$ and aryl groups. Preferably, $R_1$ and $R_2$ are each selected from the group consisting of $C_1 - C_{12}$ alkyl, $C_6 - C_{10}$ cycloalkyl, phenyl and benzyl groups. More preferably, $R_1$ and $R_2$ are the same and are $C_1 - C_8$ alkyl radicals. The aforementioned alkyl and aryl groups can be branched or straight chain and the alkyl, aryl and cycloalkyl groups can contain substituents that do not adversely effect the polymerization reaction or the polymer product, e.g., alkoxy, hydroxyl, cyano, etc. groups.

Suitable examples of dialkyl pyrocarbonates useful in the present process include: dimethyl pyrocarbonate, diethyl pyrocarbonate, diisopropyl pyrocarbonate, di-n-propyl pyrocarbonate, di-n-butyl pyrocarbonate, diisobutyl pyrocarbonate, di-tertiarybutyl pyrocarbonate, di-secondarybutyl pyrocarbonate, dicyclohexyl pyrocarbonate, di-2-ethylhexyl pyrocarbonate and di-4-tertiarybutylcyclohexyl pyrocarbonate. Economically preferred are dimethyl pyrocarbonate, diethyl pyrocarbonate, di-n-propyl pyrocarbonate, diisopropyl pyrocarbonate and the dibutyl pyrocarbonates.

The dialkyl pyrocarbonates can be prepared by reacting alkali metal alkylcarbonate, e.g., sodium ethylcarbonate, and alkyl halocarbonate, e.g., ethylchlorocarbonate (ethylchloroformate). The alkyl groups of the alkylcarbonate and halocarbonate are chosen to correspond to the alkyl groups desired for the pyrocarbonate. For example, sodium ethoxide, which can be prepared by dissolving sodium metal in a toluene solution of ethyl alcohol, is carbonated with carbon dioxide to prepare sodium ethyl carbonate. Thereafter, the sodium ethyl carbonate is reacted with ethyl chloroformate to form diethyl pyrocarbonate and sodium chloride. The chloride salt is filtered and the pyrocarbonate recovered by distillation. The aforementioned latter reaction can be characterized by the following balanced equation:

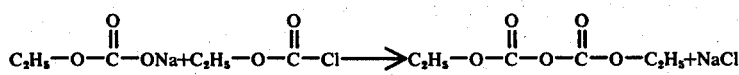
II.

Dialkyl pyrocarbonates can be prepared also by reacting alkyl halocarbonate, e.g., ethyl chloroformate, with sodium hydroxide in the presence of a catalyst of a tertiary amine or quaternization product thereof having at least one ω-hydroxyalkyl, ω-hydroxyalkyl ether or ω-hydroxyalkyl polyether group connected to the nitrogen atom. See, for example, Example 6 of U.S. Pat. No. 3,326,958. In that example, ethylchloroformate and methylene chloride containing a catalytic amount of the reaction product of 8 moles of ethylene oxide with 1 mole of N-methyl-stearylamine were mixed. Sodium hydroxide is added dropwise to the mixture with stirring and cooling to 18°-22° C. The methylene chloride layer is separated, dried and distilled. After removing the methylene chloride, the residue is distilled under vacuum. Diethyl pyrocarbonate distills over at a boiling point of 83°-84° C. at 11 mm. of mercury. The aforementioned reaction can be represented by the following equation:

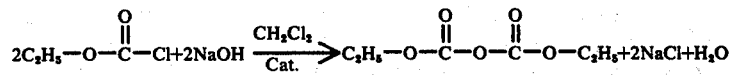
III.

The preparative method hereinabove first described, namely the use of an alkali metal alkylcarbonate and an alkyl halocarbonate, offers the potential for preparing mixed dialkyl pyrocarbonates, i.e., a pyrocarbonate in which the alkyl group at each end of the molecule are different. See, for example, page 34 of the article, "Synthesen Mit Pyrokoklensaureestern", by W. Thoma and H. Rinke, Annalen der chemie, 624 (1959). Some examples of mixed pyrocarbonates include: methyl ethyl pyrocarbonate, ethyl B-chloroethyl pyrocarbonate, ethyl allyl pyrocarbonate, ethyl B-methoxyethyl pyrocarbonate, ethyl phenyl pyrocarbonate, ethyl benzyl pyrocarbonate, ethyl cyclohexyl pyrocarbonate, ethyl 2,4-dichlorophenyl pyrocarbonate, ethyl 3,4-dichlorobenzyl pyrocarbonate, ethyl n-propyl pyrocarbonate, ethyl isopropyl pyrocarbonate, ethyl sec-butyl pyrocarbonate, ethyl 2-ethylhexyl pyrocarbonate, and methyl n-propyl pyrocarbonate.

Anhydrides useful in the practice of the present process are anhydrides of aliphatic and aromatic carboxylic acids, preferably saturated monocarboxylic acids, which can be represented by the general formula,

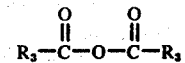
IV.

wherein $R_3$ is alkyl, aryl or cycloalkyl radicals. Generally, the alkyl radical contains from 1 to 20 carbon atoms, more commonly from 1 to 12 carbon atoms. The aryl and cycloalkyl radicals typically contain from 6 to 10 carbon atoms. The alkyl radicals can be branched or straight chain, and the alkyl, aryl and cycloalkyl radicals can contain substituents that do not adversely affect the polymerization reaction or polymer product, e.g., alkoxy, halogen, such as chlorine, bromine and fluorine, hydroxyl, cyano, etc., groups. Preferably, as in the polymerization of vinyl-type unsaturated materials, e.g., vinyl chloride, $R_3$ is a straight chain alkyl group or the isopropyl group.

Examples of acid anhydrides include: acetic anhydride, propionic anhydride, butyric anhydride, isobutyric anhydride, pivalic anhydride, valeric anhydride, isovaleric anhydride, 2-methyl butyric anhydride, 2-ethyl butyric anhydride, caproic anhydride, caprylic anhydride, isocaproic anhydride, n-heptanoic anhydride, nonoic anhydride, decanoic anhydride, neodecanoic anhydride, undecanoic anhydride, neoheptanoic anhydride, lauric anhydride, tridecanoic anhydride, 2-ethyl hexanoic anhydride, acetic propionic anhydride, acetic isobutyric anhydride, myristic anhydride, palmitic anhydride, stearic anhydride, phenylacetic anhydride, cyclohexanecarboxylic anhydride, 3-methyl-cyclopentanecarboxylic anhydride, beta-methoxy propionic anhydride, alpha-ethoxy butyric anhydride, benzoic anhydride, o-, m-, and p-toluic anhydride, 2,4,6-trimethylbenzoic anhydride, o-, m-, and p-chlorobenzoic anhydride, o-, m-, and p-bromobenzoic anhydride, o-, m-, and p-nitrobenzoic anhydride, o- and p-hydroxybenzoic anhydride, o-, m-, and p-aminobenzoic anhydride, and o-, m-, p-methoxybenzoic anhydride.

The peroxygen compound used in the aforementioned initiator system is selected from the group consisting of organic peroxy acid (peracid) and an inorganic peroxide, of which hydrogen peroxide and sodium peroxide are the most common. Preferably, the peracid is a saturated aliphatic or aromatic percarboxylic acid. Such peracids can be represented by the general formula,

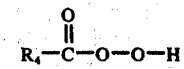
V.

wherein $R_4$ is an aliphatic, e.g., alkyl, radical of from 1 to 20 carbon atoms or an aryl radical of from 6 to 10 carbon atoms. Preferably, the alkyl radical contains from 1 to 12 carbon atoms. The aliphatic group can, of course, be branched or straight chain. The alkyl and aryl radicals can contain substituent groups that do not adversely affect the polymerization reaction or polymer product, e.g., alkoxy, halogen, such as chlorine, bromine or fluorine, hydroxyl, cyano, etc. groups.

Examples of peracids include: peracetic acid, permonochloroacetic acid, trifluoroperacetic acid, perdichloroacetic acid, pertrichloroacetic acid, perpropionic acid, permonochloropropionic acid, perdichloropropionic acid, perbromoacetic acid, perbromopropionic acid, per-alpha-chlorolauric acid, per-alpha, alpha-dichlorolauric acid, per-12-hydroxystearic acid, per-alpha-bromocapric acid, per-alpha-bromostearic acid, perglycolic acid, peroxylactic acid, perpyruvic acid, 3-chloroperbenzoic acid, m-bromo-perbenzoic acid, pentafluoroperbenzoic acid, p-tertiarybutyl perbenzoic acid, per-n-butyric acid, perisobutyric acid, pervaleric acid, perpivalic acid, perisovaleric acid, percaproic acid, percaprylic acid, pernonoic acid, perdecanoic acid, perneodecanoic acid, perheptanoic acid, perundecanoic acid, perlauric acid, pertridecanoic acid, permyristic acid, perpentadecanoic acid, perpalmitic acid, perheptadecanoic acid, perstearic acid, pernonadecanoic acid, pereicosanoic acid, per(alpha-ethyl-decanoic) acid, per(alpha-ethyl-dodecanoic) acid, per(alpha-phenyldodecanoic) acid, phenylperacetic acid, peroxyfuroic acid, cyclohexanepercarboxylic acid, perbenzoic acid, 2-, 3-, and 4-nitroperbenzoic acid, 2-chloro-perbenzoic acid, 4-chloro-perbenzoic acid, 2,4- and 3,4-dichloroperbenzoic acid, p-fluoro-perbenzoic acid, 2-methyl-perbenzoic acid, p-isopropylperbenzoic acid, 4-methoxy-perbenzoic acid, 4-cyanoperbenozoic acid, o- and m-aminoperbenzoic acid, o- and p-hydroxyperbenzoic acid, o-bromoperbenzoic acid, 2-methyl-perbutyric acid, 2-ethyl perbutyric acid and perphthalic acid.

The peroxygen compound can be also an inorganic peroxide that is capable of providing the peroxy group, e.g., hydrogen peroxide, in the polymerization medium can be used. Of the inorganic peroxides, the most common is hydrogen peroxide and sodium peroxide. Any source of hydrogen peroxide, i.e., a peroxygen compound which, when dissolved in the polymerization medium, yields hydrogen peroxide, can be used. Thus, sodium peroxide which provides hydrogen peroxide and sodium hydroxide when dissolved in water can be used. Hydrogen peroxide is, of course, commercially available in several strengths. It can be prepared commercially by the alternate catalytic reduction-oxidation of an anthraquinone, e.g., 2-ethyl-anthraquinone. Strengths at which hydrogen peroxide is commercially available include: 3 percent, 6 percent, 27.5 percent, 30 percent, 35 percent, 50 percent, 70 percent and 90 percent. Preferably the moderately concentrated grades, e.g., 27.5 – 50 percent, are used since such grades do not introduce as much water into the system as the less concentrated grades and are safer to handle than the more concentrated grades. Sodium peroxide is prepared commonly by heating metallic sodium at about 300° C. in a retort in a current of dry air from which carbon dioxide has been removed. As used herein, the term "hydrogen peroxide" is intended to mean and include hydrogen peroxide and a source of hydrogen peroxide, i.e., an inorganic peroxide, the decomposition of which provides hydrogen peroxide, e.g., sodium peroxide.

Acid anhydrides are typically prepared commercially by heating the corresponding carboxylic acid with acetic anhydride and distilling off acetic acid. This method is useful for preparing symmetrical anhydrides. A further process for making acid anhydrides is to condense an acid chloride with the sodium salt of the same acid. This process can be used to prepare symmetrical and unsymmetrical anhydrides. Thus, by condensing an acid chloride with the sodium salt of a different carboxylic acid, unsymmetrical acid anhydrides can be prepared.

Numerous methods are known for the preparation of peroxy acids. The lower peroxycarboxylic acids (to $C_4$) are generally prepared by the direct acid-catalyzed reaction of the parent carboxylic acid and 30 to 98 percent hydrogen peroxide. Sulfuric acid or sulfonic acid type ion exchange resins are the most effective and most commonly used catalysts. With water insoluble aliphatic carboxylic acids up to $C_{16}$ or $C_{18}$, concentrated sulfuric acid is a mutual solvent and reaction medium. Yields of $C_6 - C_{16}$ peroxy acids are usually high and sometimes quantitative when the appropriate excess of 50 to 65 percent hydrogen peroxide is employed. The $C_{18}$ and longer chain aliphatic acids are too insoluble in sulfuric acid, but methanesulfonic acid can be used instead. Chain-substituted aliphatic or aromatic peroxy acids can also be prepared by the methanesulfonic acid procedure. Peroxycarboxylic acids have also been obtained by the reaction of carboxylic acid chlorides or anhydrides with either hydrogen peroxide or sodium peroxide. A further method for the preparation of peroxy-carboxylic acids involves the controlled free-radical initiated auto-oxidation of aldehydes in the liquid phase. Details of the aforementioned methods can be found in *Organic Peroxides*, Volume I, pages 313–433, Daniel Swern, Editor, Wiley-Interscience, New York, N.Y. (1970).

The amount of acid anhydride used in the practice of the present process can vary widely and will depend on the monomer polymerized, the amount of pyrocarbonate used and the temperature at which the polymerization is conducted. Typically, however, from about 0.001 to about 3 weight percent of acid anhydride, based on the total amount of monomer polymerized, is used. With respect to the polymerization of vinyl chloride, amounts of from about 0.01 to about 1 weight percent acid anhydride are suitable.

The amount of dialkyl pyrocarbonate, e.g., diethyl pyrocarbonate, used in the practice of the present process can vary widely and will depend on the monomer polymerized, the amount of acid anhydride used and the temperature at which the polymerization is conducted. Typically, however, from about 0.001 to about 3 weight percent of dialkyl pyrocarbonate, based on the total amount of monomer polymerized, is used. With respect to the polymerization of vinyl chloride, amounts of from about 0.01 to about 1 weight percent dialkyl pyrocarbonate are suitable. The mole ratio of the dialkyl pyrocarbonate to acid anhydride can vary but commonly will be between about 0.1:1 and about 10:1, preferably from about 0.2:1 to about 1:1.

The amount of peracid used in the practice of one embodiment of the present process will vary, depending on the amount of acid anhydride and dialkyl pyrocarbonate used. An equimolar amount of peracid, based on the total moles of said anhydride and dialkyl pyrocarbonate is preferred; however, less than or more than a molar equivalent of peracid can be used, e.g., a mole ratio of peracid to the sum of anhydride plus pyrocarbonate of from about 0.2:1 to about 10:1 is contemplated herein. Preferably, a mole ratio of 1:1 is used.

The amount of hydrogen peroxide used in the practice of a further embodiment of the present process will vary with the total amount of acid anhydride and dialkyl pyrocarbonate used. Generally, from about 0.1 to about 10.0 and preferably from about 0.2 to about 2.0 moles of hydrogen peroxide per mole of the sum of the moles of acid anhydride and dialkyl pyrocarbonate will be used; however, more than such amounts can be used.

The relative amounts of acid anhydride, peroxygen compound and dialkyl pyrocarbonate used can vary; but, should be in amounts which, in combination with alkaline reagent, is sufficient to polymerize the ethylenicaly unsaturated monomer. Thus, the aforementioned initiator reactants should be used in amounts sufficient to provide at least about an 80 percent conversion of monomer in about 16 hours at the temperature of the polymerization. As pointed out hereinafter, it is believed that the initiator reactants give rise in situ to the formation of dialkyl peroxydicarbonate, diacyl peroxide and acyl peroxycarbonate, depending of course on the reactants used. Each of the initiator compounds theoretically produced have a particular reactivity, i.e., generate free radicals at a given rate; at the various temperatures occuring at different times during the polymerization. By the judicious selection of reactants, initiator compounds can be prepared theoretically in situ to give a smooth and continuous polymerization without induction periods and initiator exhaustion. Thus, it is possible to provide for the presence of fast acting, moderately active and relatively slow acting initiator compounds in the polymerization medium at a given temperature and thereby balance the reactivity of the initiators over the polymerization cycle. Thus, as one initiator is exhausted, another initiator takes over the initiating function.

For example, at the beginning of the polymerization the fast acting initiator serves to initiate the polymerization which causes the temperature of the polymerization medium to rise. As this initiator becomes exhausted, the moderately active initiator takes over the initiating function because it is more efficient at the temperature at which the fast acting initiator becomes exhausted. When the moderately active initiator becomes exhausted, the relatively slow acting initiator takes over the initiating function and completes the polymerization cycle.

In addition to the organic acid anhydride, peroxygen compound and dialkyl pyrocarbonate, an alkaline reagent is used as part of the initiator recipe system. The presence of an alkaline reagent promotes the interaction of the initiator reactants, namely the aforementioned anhydride, pyrocarbonate and peroxygen compound. The alkaline reagent can be added to the polymerization medium as part of the initiator system or can be present in the polymerization system as part of the polymerization recipe. Regardless of the reason for its introduction, sufficient alkaline reagent should be present in the polymerization medium to satisfy both the requirements of the polymerization recipe and the initiator system. With respect to the initiator system, the alkaline reagent, i.e., a base, serves to neutralize acidic by-products resulting from reaction of the initiator reactants. Examples of such acidic by-products include organic acids derived from the acid anhydride. The alkaline reagent should be soluble in the polymerization medium and/or the phase wherein the initiator components react.

Suitable alkaline buffering reagents that can be used include soluble organic and inorganic alkali metal and alkaline earth metal reagents that produce an alkaline response in the polymerization medium or provide a buffering effect therein, such as the hydroxides, carbonates, bicarbonates, organic acid salts, phosphates, etc. of such metals. Examples of the aforesaid metals include lithium, sodium potassium and calcium. Specific examples of suitable basic reagents include: lithium, sodium and potassium hydroxides, sodium bicarbonate, sodium carbonate, potassium carbonate, potassium bicarbonate, calcium acetate, calcium carbonate, calcium hydroxide, calcium magnesium orthosilicate, the various phosphates of calcium and sodium, e.g., trisodium phosphate, sodium pyrophosphate, calcium orthophosphate, calcium pyrophosphate, sodium acetate, borates, e.g., borax, potassium tartrate, sodium citrate, ammonium hydroxide, and mixtures of such basic compounds.

Organic bases that can be used as the alkaline buffering reagent are those organic compounds that are soluble in the polymerization medium and that can abstract a hydrogen atom (proton) from hydrogen peroxide or the peracid. Examples of such compounds include: pyridine, triethyl amine, triethylene diamine, and quaternary ammonium hydroxides, e.g., the Triton surfactants, tetramethylammonium hydroxide, trimethyl s-butylammonium hydroxide, tetraethylammonium hydroxide, trimethylcetylammonium hydroxide, dioctadecyldimethylammonium hydroxide, octadecyldimethylbenzylammonium hydroxide and benzyltrimetylammonium hydroxide (Triton B). The quaternary ammonium hydroxides are preferred. These compounds dissociate in solution, e.g., aqueous solution and have the same basic strength in water as sodium or potassium hydroxide.

Quaternary ammonium hydroxides can be represented by the general formula,

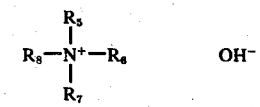

VI.

wherein $R_5$, $R_6$, $R_7$ and $R_8$ are each selected from the group consisting of $C_1 - C_{20}$ alkyl, and $C_7 - C_{20}$ aralkyl. Preferably, at least two of the organic substituents are alkyl radicals and more preferably lower alkyl ($C_1 - C_4$) substituents. The aforementioned compounds, more commonly written $(R)_4N^+OH^-$ can be prepared by shaking the corresponding quaternary ammonium halide or acid sulfate with silver hydroxide or barium hydroxide respectively.

The amount of alkaline buffering reagent used is not critical and typically varies from 100 to 1,000 weight percent, based on the combined amount of acid anhydride and dialkyl pyrocarbonate used. Expressed differently a suitable concentration of buffering reagent is from about 0.01 percent to about 10 percent, preferably from about 0.5 percent to about 1.5 percent, by weight of the monomer feed. The buffering reagent can be used to maintain the pH of the reaction mixture between 6 and 12, usually between 8 and 9. Consequently, suitable buffering agents may be present already in the polymerization medium, depending on the polymerization recipe.

While the particular mechanism by which the acid anhydride, peroxygen compound and dialkyl pyrocarbonate (in the presence of the alkaline buffering reagent) initiate polymerization of the monomeric materials described herein is not known with certainty, it is believed that when hydrogen peroxide is the peroxygen compound, a mixture of three peroxy compounds, namely a diacyl peroxide, a peroxydicarbonate and an acyl peroxycarbonate are produced in situ and in the presence of the monomer which peroxy compounds decompose and initiate the polymerization reaction. When the peroxygen compound is a peracid, it is believed that a diacyl peroxide and acyl peroxycarbonate are produced in situ.

While not wishing to be bound by any particular theory, it is believed from the evidence at hand that when the peroxygen compound is hydrogen peroxide, at least a portion of the anhydride reacts with hydrogen peroxide to form the corresponding peroxy acid (peracid) and that such peracid reacts with further acid anhydride to form the corresponding diacyl peroxide. Similarly, the hydrogen peroxide reacts with the dialkyl pyrocarbonate to form a peroxydicarbonate. Further, it is believed that the acid anhydride and dialkyl pyrocarbonate react in some manner to form an acyl peroxycarbonate. When the peroxygen compound is the peroxy acid, it is believed that the anhydride combines with the peracid to form a diacyl peroxide and the peracid combines also with the dialkyl pyrocarbonate to form an acyl peroxycarbonate.

The aforementioned peroxy compounds decompose to form free radicals which initiate the polymerizatin of the monomeric material. From the experimental evidence at hand, it appears that the formation of the aforementioned peroxy compounds occurs concurrently with the polymerization reaction. By choosing properly the acid anhydride, peroxygen compound and dialkyl pyrocarbonate, it is possible to produce a variety of the aforementioned organic peroxides in the polymerization medium. Thus, a variety of diacyl peroxides can be produced. For example, by utilizing mixed anhydrides, i.e., unsymmetrical anhydrides, further variations in the specific diacyl peroxide or acyl peroxycarbonate produced can be obtained. Similarly, it is possible to produce a variety of peroxydicarbonate and acyl peroxycarbonate esters in the polymerization medium. Since the reactivity of the peroxy compounds described above depends, in part, on the nature of the alkyl substituents surrounding the peroxy grouping, it is, therefore, possible to conduct polymerizations with a wide variety of peroxy compounds without the attendant hazards associated with the use of the preformed peroxygen compounds.

Moreover, by utilizing more than one acid anhydride and/or more than one peroxy acid and/or more than one dialkyl pyrocarbonate, it is possible to produce several different peroxy compounds of the same general class in the polymerization medium and thereby conduct the polymerization in the presence of peroxy compounds having different reactivities.

The peroxy compounds that are believed to be produced in situ when hydrogen peroxide is the peroxygen compound used in the initiator system can be represented by the following formulae:

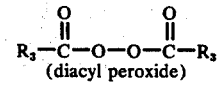
(diacyl peroxide) VII.

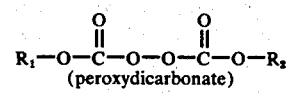
(peroxydicarbonate) VIII.

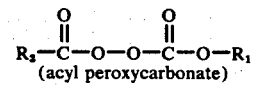
(acyl peroxycarbonate) IX.

wherein $R_1$, $R_2$ and $R_3$ are as defined above.

The peroxy compounds that are believed to be produced in situ when peroxy acid is the peroxygen compound used in the initiator system can be represented by the following formulae:

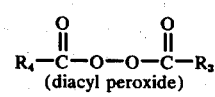
(diacyl peroxide) X.

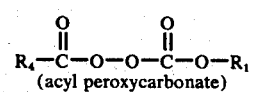
(acyl peroxycarbonate) XI.

wherein $R_1$, $R_3$, and $R_4$ are as defined above.

Typical examples of diacyl peroxides coming within formulae VII and X include: diacetyl, dipropionyl, diisobutyryl, di-n-butyryl, dipivaloyl, diisovaleryl, di-2-ethylhexanoyl, dibenzoyl, acetyl isobutyryl, acetyl butyryl, acetyl valeryl, acetyl propionyl, acetyl pivaloyl, acetyl benzoyl and acetyl-2-methyl butyryl peroxides.

Typical examples of peroxydicarbonates include those peroxy dicarbonates in which $R_1$ and $R_2$ in formula VIII are the same and are ethyl, n-propyl, isopropyl, n-butyl, isobutyl, secondary butyl, tertiary butyl, capryl, 2-ethylhexyl, benzyl, cyclohexyl and 4-tertiary butyl cyclohexyl. Typical examples of acyl peroxycarbonates coming within formulae IX and XI include those in which $R_1$ is methyl, ethyl, isopropyl, propyl, t-butyl, $R_4$ is methyl and $R_3$ is ethyl, n-propyl, isopropyl, n-butyl, secondary butyl, isobutyl, tertiary butyl, 2-ethylhexyl, cyclohexyl, 4-tertiarybutyl cyclohexyl, benzyl and phenyl.

The theoretical amount of peroxy compounds required to initiate the polymerization process typically varies from about 0.001 to about 1.0 weight percent, preferably from about 0.1 to about 0.05 weight percent, based on the total amount of monomer or monomeric material used. More generally, the amount of peroxy compounds which are required to initiate the polymerization reaction is commonly referred to as an initiating amount. Thus, the amounts of initiator reactants used are chosen to produce a theoretical yield of peroxy compound which is in the aforementioned range, i.e., an initiating amount.

The method described herein is applicable to the polymerization of ethylenically unsaturated materials, i.e., materials containing an ethylenic

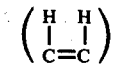

or vinyl ($CH_2 = C<$) linkage, particularly single $CH_2 =$ CH—groups that are susceptible to free-radical polymerization. Examples of such compounds include: aryl-substituted olefins, such as styrene, alpha chlorostyrene and the like; acrylic and alpha-substituted acrylic acids, e.g., methacrylic acid, $C_1 - C_4$ alkyl esters, nitriles and amides of such acids, such as acrylonitrile, alpha-methacrylonitrile, methyl acrylate, ethyl acrylate, methyl methacrylate, methacrylamide, acrylamide and the like; vinyl esters, ethers, ketones and halogen-containing vinyl and vinylidene compounds, such as vinyl chloride, vinylidene chloride, vinyl bromide, vinylidene bromide, vinyl acetate, vinyl propionate, vinyl butyrate, vinyl fluoride, vinylidene fluoride, 1,1-chlorofluoroethylene, tetrafluoroethylene, 1,1-difluoro-2,2-dichloroethylene, perfluoropropylene, 3,3,3-trifluoropropylene, 3,3,3-trichloropropylene and 2-chloropropylene and the like; and unsaturated polyesters, particularly water dispersible unsaturated polyesters having a high acid number.

Unsaturated polyesters are prepared typically by the reaction of dibasic acids or anhydrides and polyhydric alcohols one of which is unsaturated. Generally, the acid or anhydride reactant is unsaturated. Common examples thereof include maleic acid, maleic anhydride, fumaric acid and itaconic acid. Often, saturated acids or anhydrides are used in addition to the unsaturated acid. Examples thereof include chlorendic acid and anhydride, succinic acid and anhydride, sebacic acid, o-phthalic acid and anhydride, isophthalic acid, terephthalic acid and adipic acid.

Polyhydric alcohols typically are dihydric but may contain three or more hydroxyls. Examples of such alcohols include ethylene glycol, propylene glycol, diethylene glycol, triethylene glycol, neopentyl glycol, tetraethylene glycol, butylene glycol, dipropylene glycol, glycerol, trimethylolethane, trimethylolpropane, pentaerythritol, sorbitol and others.

The preparation of unsaturated polyesters is well known. See, for example, U.S. Pat. No. 3,390,135. By further reacting the unsaturated polyester with a vinyl type monomer, such as vinyl acetate, styrene and methyl methacrylate, cross-linked, three-dimensional resins are formed. Copolymerization of the unsaturated polyester with the vinyl monomer to form polyester resins is free-radical initiated since the reaction is essentially a vinyl-type polymerization. The present process is applicable, therefore, to the preparation of such polyester resins.

Additional applications for the aforementioned initiator system include curing agents for elastomers, e.g., natural and butadiene rubbers, polyurethanes and adhesives and as cross-linking agents for polyolefins, e.g., polyethylene and ethylene-containing copolymers.

The present process is particularly applicable to the polymerization of vinyl chloride, as well as the copolymerization of mixtures of two or more of the aforementioned monomeric materials, e.g., the polymerization of vinyl chloride with other copolymerizable monomers, such as vinyl bromide, vinylidene chloride, vinyl acetate, methyl acrylate, methyl methacrylate and the like. When copolymerizing vinyl chloride with other monomer(s) copolymerizable therewith, vinyl chloride is used generally in amounts greater than 50 mole percent, e.g., from 75 to 95 mole percent of vinyl chloride and from 5 to 25 mole percent of one or more of the other unsaturated copolymerizable monomer(s). The type of polymer products contemplated herein include graft, random, alternating and block copolymers. The exact nature of the polymer product is more a function of the polymerization procedure than the particular initiator used.

The type of polymer produced by the polymerization or copolymerization of the aforementioned polymerizable materials, e.g., monomers such as vinyl chloride, depends to a large extent on the temperature at which the polymerization is conducted. For example, polyvinyl chloride having properties useful for major commercial applications of that polymer are prepared typically at polymerization temperatures in the range of 40° – 65° C.

The present process of providing a mixture of organic peroxides, e.g., diacyl peroxide and dialkyl peroxydicarbonate, in situ in a polymerization system, especially initiating amounts of peroxides, is applicable particularly to both aqueous emulsion and suspension polymerizations, i.e., polymerizations conducted in an aqueous medium, as well as bulk polymerizations wherein no solvent or aqueous medium (water) is used. Bulk polymerization is the polymerization of pure monomer(s) during which the only additives present are such aids to polymerization as initiators, chain regulators, activators, etc. The present process is also considered to be utilizable for solution polymerizations wherein the polymerization is carried out in the presence of a solvent. In the case of bulk polymerizations, soluble organic base is used as the alkaline buffering reagent. For purposes of brevity, both types of aqueous polymerizations will be referred to collectively as a suspension polymerization. By initiating amount is meant those amounts of initiator reactants that when used collectively are sufficient to cause polymerization of the polymerizable monomer, i.e., sufficient to form polymer molecules from the particular monomer(s) used. Typically, an amount of initiator reactants are used to provide at least about 80 percent conversion of monomer after 16 hours at the temperature of the polymerization.

The practice of the present process is especially useful in the polymerization of monomeric materials heretofore described in an aqueous medium. In a typical suspension polymerization, the polymerization vessel is filled with water to which is added suspending agents, chain terminators, acid anhydride(s), dialkyl pyrocarbonate(s), peroxy acid(s) and/or hydrogen peroxide and alkaline buffering agent. The polymerizable monomer is then charged to the vessel and the vessel closed.

The amount of water used, which is typically demineralized water, is large, based on the amount of monomeric material charged to the vessel. Dilution ratios of 2:1 to 40:1, usually 3:1 to about 20:1 are common. At such dilution ratios, it is surprising to find that the acid anhydride, dialkyl pyrocarbonate and peracid or hydrogen peroxide in the typical amounts used to produce initiating amounts of initiator, appear to react with one another to generate in situ in the presence of the polymerizable monomer what is believed to be diacyl peroxide, dialkyl peroxydicarbonate and acyl peroxycarbonate compounds. This is especially surprising since the acid anhydride, dialkyl pyrocarbonate and peracid also hydrolyze in water. It, therefore, might have been assumed that with the above dilutions, the competing hydrolysis reactions of the acid anhydride, dialkyl pyrocarbonate and peracid would proceed at such a rate that little, if any, organic peroxide would be formed, much less, the amount needed to initiate and sustain a polymerization reaction.

The temperature at which polymerization of the above-described monomeric materials is conducted can, of course, vary over a wide range. The particular temperatures used will depend on the particular material polymerized and the properties of the polymer desired since, as stated heretofore, the polymerization temperature affects the properties of the polymer. Generally, such polymerizations are conducted at temperatures of from about 0° to about 95° C. With particular reference to the polymerization of vinyl chloride and the copolymerization of vinyl chloride with other copolymerizable monomers, e.g., vinyl acetate or vinylidene chloride, polymerization temperatures typically range from about 20° to about 70° C. e.g., 40° to 65° C.

In conducting the process of the present invention, acid anhydride, dialkyl pyrocarbonate, peroxygen compound, e.g., hydrogen peroxide or peracid and alkaline buffering reagent (if not already present) are introduced simultaneously or in any sequential order into the polymerization vessel, i.e., into the medium in which the polymerization is conducted and into the presence of the monomer. Preferably the aforementioned compounds are introduced separately; however, they may be mixed momentarily in the absence of the alkaline reagent before introduction for convenience, e.g., charging to the vessel through one inlet port. Premixing, such as at room temperature or above, may likely result in some pre-reaction and loss of potentially available free radicals in the polymerization medium. The manner of addition of the acid anhydride, pyrocarbonate, peroxygen compound or alkaline buffering reagent to the polymerization medium is not critical to the practice of the present process. Thus, the initiator reactant components can be introduced all at once or metered in continuously or intermittently, diluted with a suitable solvent or diluent, or in undiluted form. By suitable solvent or diluent is meant any material that does not affect the stability of the initiator reactant components or deleteriously affect the polymerization of the monomer(s) being polymerized or the properties of the polymer product. While reference is made to polymerization vessel, etc., it is not intended that the use of the present initiator system be limited thereto. Thus, the system can be used in any container wherein initiators are required, e.g., molds, lay-ups, etc. It is preferred that the alkaline buffering reagent be added to the polymerization vessel first and then the initiator system reactants added separately and substantially simultaneously.

As mentioned, much of the commercial polymerizations of the above-described monomers occur in an aqueous polymerization medium to which has been added an emulsifying or suspending agent. Such agents aid in suspending or dispersing the polymer particles in the aqueous medium as they are formed, i.e., to form a latex or slurry type effluent, usually having 35 percent or more dispersed solids, that is discharged from the polymerization vessel.

The particular suspending agent used in the practice of the present process is not critical. Such materials can be non-ionic, cationic or anionic, as well as mixtures thereof. Examples of anionic agents are the sodium salts of sulfated or sulfonated hydrocarbons and fatty acids, such as dioctyl sodium sulfosuccinate, sodium dodecylbenzenesulfonate, sodium decylbenzenesulfonate, ammonium laurylbenzenesulfonate, potassium stearylbenzenesulfonate, potassium myristylnaphthalenesulfonate, potassium oleate, ammonium laurate, sodium laurate; sulfonated diesel oil and sodium lauryl sulfate (Duponol ME), sodium alkylnapthalenesulfonate (Ketal BX-78), sodium salt of sulfated alkylphenoxypolyoxyethylene (Alipol CO433), ammonium dodecylphenoxypolyoxyethylene ethyl sulfate, nonylphenoxy acetic acid, sulfated cresylic acid, disodium-N-octadecylsulfosuccinanate, tetrasodium N-(1,2-dicarboxyethyl)-N-octadecylsulfosuccinate, diamyl ester of sodium sulfosuccinic acid, dihexyl ester of sodium sulfosuccinic acid, bis (tridecyl) ester of sodium sulfosuccinic acid, dioctyl sodium sulfosuccinate, sodium dodecyl diphenyl oxide disulfonate, benzene potassium sulfonate, sodium salt of a sulfonated naphthalene-formaldehyde condensate, sodium salt of polyethoxy alkyl phenol sulfonate, sodium oleyl methyl tartrate and triethanolamine salt of polyethoxy alkyl phenol sulfonate and complex organic phosphates (Gafac RE-610). Examples of cationic agents are quaternary ammonium compounds, such as stearamidopropyl dimethyl-beta-hydroxyethyl ammonium nitrate, cetyl pyridinium chloride and cetyl trimethylammonium bromide.

Examples of non-ionic agents are high molecular weight polymers of propylene oxide and ethylene oxide, nonylphenoxypoly-(ethyleneoxy)ethanols (Igepal CO-630 and CO-880), polyoxyethylated fatty alcohol (Emulphor ON-870), alkyl aryl polyether alcohols, such as lauryl phenyl polyether ethanol, alkanolamine fatty acid condensates, such as triethanolamine coconut fatty acid ethanolamide, lauric acid propanolamide, fatty alcohol polyglycol ether, myristyl phenol polyglycol ether, polyoxyethylene monooleate, polyoxyethylene sorbitol septaoleate, polyoxyethylene sorbitol monolaurate, polyoxyethylene cetyl alcohol, polyoxyethylene stearate, glycolamide stearate, and other polyoxyethylene alkanols and alkyl phenols containing from 2 to 40 moles of ethylene oxide per mole of alkanol or alkyl phenol.

Anionic suspending agents are preferred since they are more efficient in stabilizing the resultant polymer latex. Of these, some will be found being more useful than others, depending on the process conditions and the most suitable may be found by simple experimentation. Other suspending agents that can be used in the practice of the present process are protective colloids, such as gelatin, methyl cellulose, gum tragacanth and completely or partially hydrolyzed polyvinyl acetates. Other agents include hydroxylated phosphatides of soybean oil complex (Hydroxy Lecithin).

The amount of suspending agent used typically varies from 0.3 to 5 percent, based on the weight of the polymerizable monomers, although greater or lesser amounts can be used in some circumstances since the efficiencies of individual agents vary. The suspension of the monomer in the aqueous medium can be formed by any suitable means, such as by stirring or agitating the monomer, water and suspending agent, together in a vessel.

In a further embodiment of the present process, at least one further preformed organic free-radical initiator that generates free radicals under the polymerization conditions used is introduced into the polymerization medium in addition to the acid anhydride, pyrocarbonate, and peroxygen compound, i.e., the peracid or hydrogen peroxide. In the most preferred application of the present process, a free-radical initiator having a good efficiency of free-radical generation at temperatures approximating the final desired polymerization temperature is used. Such temperature is typically above that at which the peroxy compounds theoretically generated by the initiator system reactants have a high efficiency. For example, utilization of isobutyric anhydride and hydrogen peroxide theoreticaly results in the formation of diisobutyryl peroxide which has a high free-radical generation efficiency at a temperature range of from about 30° to 40° C. The use of diisopropyl pyrocarbonate in combination therewith theoretically results in the formation of diisopropyl peroxydicarbonate, an organic peroxide compound having a high free-radical generation efficiency at about 45°–55° C. The pyrocarbonate and anhydride can also form theoretically the acyl peroxycarbonate, isobutyrylperoxy isopropylcarbonate, which has a good free-radical generation efficiency at about 55°–60° C. A further preformed free-radical initiator having a high free-radical generation efficiency at temperatures greater than about 55° C. can be used in accordance with the aforementioned further embodiment. Thus, the polymerization is initiated substantially immediately with the diisobutyryl peroxide, sustained with the diisopropyl peroxydicarbonate and isobutyrylperoxy isoproylcarbonate, and completed with the further preformed organic free-radical initiator. In this manner, polymerization is initiated at the beginning of the polymerization cycle and continued smoothly until completion.

By proper choice of initiator components, i.e., by balancing the reactivities of the theoretical diacyl peroxide(s) and peroxycarbonate ester(s) generated and the further preformed organic free-radical initiator, free-radical generation can be maintained fairly evenly over substantially the entire polymerization cycle. Thus, as the rate of free-radical generation from the diacyl peroxide source starts to decline, the rate of free-radical generation from the peroxycarbonate ester starts to increase, and as the rate of free-radical generation from the peroxycarbonate ester starts to decline, the rate of free-radical generation from the further free-radical initiator will start to increase. The end result is a smooth and continuous polymerization of generally shorter cycle times than by the use of individual free-radical initiators. The reactivities of organic peroxides can be easily approximated by investigating the decomposition kinetics in a suitable solvent, such as mineral spirits. Reactivities of most commercially available organic peroxides are published in the literature in terms of half-life values at various temperatures.

The amount of further preformed organic free-radical initiator used will vary and will depend upon the temperature of the polymerization and the theoretical amount of peroxide initiator compounds generated. Typically, however, from about 0.001 to about 0.50 weight percent of further preformed free-radical initiator, based on the total amount of monomer, is employed. The further organic free-radical initiator compound can be introduced into the polymerization medium at any time. Thus, it can be introduced separately or along with the initiator system reactants, the monomer or the water or solvent, if used. In addition, it can be metered separately into the polymerization vessel during the polymerization, e.g., after polymerization has been commenced and near exhaustion of the peroxy compounds generated in situ.

Of the further free-radical initiators that can be added to the polymerization vessel, there can be mentioned tertiarybutyl peroxyesters, e.g., tertiarybutyl perpivalate, tertiarybutyl perbenzoate, ditertiarybutyl diperphthalate and tertiarybutyl perneodecanoate; diacyl peroxides, e.g., lauroyl peroxide, benzoyl peroxide, 2,4-dichlorobenzoyl peroxide and acetyl benzoyl peroxide; ketone peroxides, e.g., methyl ethyl ketone peroxide; organic hydroperoxides, e.g., cyclohexyl hydroperoxide, cumene hydroperoxide and tertiarybutyl hydroperoxide; and non-peroxidic initiators, e.g., azobis-isobutyronitrile.

The present process is more particularly described in the following examples which are intended as illustrative only since numerous modifications and variations therein will be apparent to those skilled in the art.

EXAMPLE I

Standard 28 fluid ounce polymerization bottles were filled with a stock solution of 300 grams of demineralized water that contained 0.3 grams of Methocel 65 HG suspending agent and 0.05 grams of sodium bicarbonate. The contents of the bottles were frozen and thereafter, an additional 0.25 grams of sodium bicarbonate, 100 grams of liquid vinyl chloride and the initiator reactants were charged to each of the bottles. The initiator reactants and their amounts were:

| COMPOUND | AMOUNT |
|---|---|
| diethyl pyrocarbonate | $3.0 \times 10^{-4}$ moles |
| isobutyric anhydride | $6.0 \times 10^{-4}$ moles |
| hydrogen peroxide | $4.5 \times 10^{-4}$ moles |

The bottles were capped and placed in a constant temperature bath maintained at 50° C. where they were tumbled to agitate the contents. At various intervals, a bottle was removed from the polymerization bath and the unreacted vinyl chloride vented by inserting a hypodermic needle through the cap of the bottle until constant weight was reached. The weight loss was used to calculate the weight of polymer formed. The results of such analyses are tabulated in Table I.

TABLE I

| Time, Hours | % Conversion |
|---|---|
| 2 | 18 |
| 4 | 37 |
| 6 | 52 |
| 9 | 75 |
| 16 | 88 |

The data of Table I show that the initiator system of Example I, namely the combined use of a dialkyl pyrocarbonate, anhydride of an aliphatic carboxylic acid, and hydrogen peroxide, provides a smooth and continuous polymerization to high conversions. The amount of initiator reactants used in Example I yield theoretically 4.5 moles of total peroxide initiator. Assuming that the reactivities of the pyrocarbonate and anhydride toward the hydrogen peroxide are equal, and the intermediate compounds are formed at equal rates and partition to products in proportions to their concentration, it can be postulated (based on the aforementioned assumptions) that about $0.75 \times 10^{-4}$ moles of the peroxydicarbonate, $2.25 \times 10^{-4}$ moles of the diacyl peroxide and $1.50 \times 10^{-4}$ moles of the acyl peroxycarbonate are formed theoretically.

EXAMPLE II

The procedure of Example I was repeated. After 16 hours, 90 percent monomer conversion was obtained.

EXAMPLE III

The procedure of Example I was followed except that no diethyl pyrocarbonate initiator reactant was used and the amounts of initiator reactants used were:

| COMPOUND | AMOUNT |
|---|---|
| isobutyric anhydride | $8.0 \times 10^{-4}$ |
| hydrogen peroxide | $4.0 \times 10^{-4}$ |

Results are tabulated in Table II.

EXAMPLE IV

The procedure of Example I was followed except that no isobutyric anhydride initiator reactant was used and the amounts of initiator reactants used were:

| COMPOUND | AMOUNT |
|---|---|
| diethyl pyrocarbonate | $6.7 \times 10^{-4}$ |
| hydrogen peroxide | $3.3 \times 10^{-4}$ |

Results are tabulated in Table II.

TABLE II

| Example | Reactants | % Conversion of Monomer At | | | | |
|---|---|---|---|---|---|---|
| | | 2 hrs. | 4 hrs. | 6 hrs. | 9 hrs. | 16 hrs. |
| III | isobutyric anhydride hydrogen peroxide | 24 | 36 | 43 | —* | 50 |
| IV | diethyl pyrocarbonate hydrogen peroxide | — | — | — | — | 92 |

*indicates not measured

The data of Example III shows that the combined use of isobutyric anhydride and hydrogen peroxide in amounts sufficient to produce theoretically $4.0 \times 10^{-4}$ moles of diisobutyryl peroxide can initiate the polymerization of vinyl chloride at 50° C. The data further shows that the peroxide is exhausted early in the polymerization. The data of Example IV shows that the combined use of diethyl pyrocarbonate and hydrogen peroxide in amounts sufficient to produce theoretically $3.35 \times 10^{-4}$ moles of diethyl peroxydicarbonate can initiate the polymerization of vinyl chloride at 50° C. and provide high conversions. Thus, by combining the initiation systems of Examples III and IV as, for example, in Example I ($4.5 \times 10^{-4}$ total moles of theoretical initiator), a smooth and continuous polymerization to high conversions is obtained.

EXAMPLE V

The procedure of Example I is followed except that the amount of diethyl pyrocarbonate is increased to $5.0 \times 10^{-4}$ moles and the amount of isobutyric anhydride is decreased to $3.0 \times 10^{-4}$ moles. The polymerization temperature is 54° C. and after about 7 hours, it is estimated that about 85 percent of the vinyl chloride monomer is converted to polymer.

EXAMPLE VI

The procedure of Example I is followed except that the amount of diethyl pyrocarbonate is $4.0 \times 10^{-4}$ moles, the amount of isobutyric anhydride is $3.0 \times 10^{-4}$ moles and the amount of hydrogen peroxide is $3.5 \times 10^{-4}$ moles. The polymerization temperature is 54° C and after about 7 hours, it is estimated that 65 percent of vinyl chloride monomer is converted to polymer.

EXAMPLE VII

The procedure of Example I is followed except that the initiator reactants and their respective amounts are: diisopropylpyrocarbonate — $3.0 \times 10^{-4}$ moles; isobutyric anhydride — $6.0 \times 10^{-4}$ moles; and hydrogen peroxide — $4.5 \times 10^{-4}$ moles. The polymerization temperature is 45° C. It is estimated that about 42 percent of vinyl chloride monomer is converted to polymer after about 4 hours, and about 73 percent of the monomer is converted to polymer after about 10 hours.

EXAMPLE VIII

The procedure of Example VII is followed except that the polymerization temperature is programmed for the following schedule: 2 hours at 40° C., 3 hours at 45° C., and 3 hours at 50° C. At the end of the 8 hours of polymerization, it is estimated that about 87 percent of monomer is converted.

EXAMPLE IX

The procedure of Example I is followed except that the initiator reactants and the amounts used are: secondary butyl pyrocarbonate — $5.0 \times 10^{-4}$ moles, n-butyric anhydride — $3.0 \times 10^{-4}$ moles and hydrogen peroxide — $4.0 \times 10^{-4}$ moles. The polymerization temperature is 54° C. After about 7 hours, it is estimated that about 85 percent of monomer is converted.

EXAMPLE X

The procedure of Example I is followed except that the initiator reactants and the amounts used are: diisopropyl pyrocarbonate — $3.0 \times 10^{-4}$ moles, isobutyric anhydride — $5.0 \times 10^{-4}$ moles, and peracetic acid — $8.0 \times 10^{-4}$ moles. The polymerization temperature is 54° C. After about 16 hours, it is estimated that about 91 percent of monomer is converted.

EXAMPLE XI

The procedure of Example I is followed except that the initiator reactants and the amounts used are dicyclohexyl pyrocarbonate — $4.0 \times 10^{-4}$ moles, propionic anhydride — $4.0 \times 10^{-4}$ moles, and hydrogen peroxide — $4.0 \times 10^{-4}$ moles. The polymerization temperature is 60° C. It is estimated that about 89 percent of monomer is converted to polymer after about 16 hours.

EXAMPLE XII

The procedure of Example I is followed except that the initiator reactants and the amounts used are diethyl pyrocarbonate — $3.5 \times 10^{-4}$ moles, isobutyric anhydride — $4.5 \times 10^{-4}$ moles, and peracetic acid — $9.0 \times 10^{-4}$ moles. The polymerization temperature is 54°C. It is estimated that about 90 percent of monomer is converted to polymer after about 16 hours.

EXAMPLE XIII

The procedure of Example I is followed except that initiator reactants and the amounts used are diisopropyl pyrocarbonate — 4.0 × 10⁻⁴ moles, isobutyric anhydride — 5.0 × 10⁻⁴ moles, and perisobutyric acid — 9.0 × 10⁻⁴ moles. The polymerization temperature is 54° C. It is estimated that about 88 percent of monomer is converted to polymer after 16 hours.

I claim:

1. In the process for polymerizing ethylenically unsaturated material susceptible to polymerization with free radical type initiators in an aqueous or bulk polymerization medium, the improvement which comprises conducting said polymerization in the presence of an initiator system comprising, in combination,
   a. alkaline reagent,
   b. organic acid anhydride represented by the general formula:

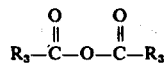

wherein $R_3$ is selected from the group consisting of substituted and unsubstituted $C_1 - C_{20}$ alkyl, $C_6 - C_{10}$ cycloalkyl, and $C_6 - C_{10}$ aryl radicals,
   c. peroxygen compound selected from the group consisting of hydrogen peroxide and organic peroxy acid represented by the general formula:

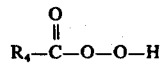

wherein $R_4$ is selected from the group consisting of substituted and unsubstituted $C_1 - C_{20}$ alkyl and $C_6 - C_{10}$ aryl radicals, and
   d. dialkyl pyrocarbonate represented by the general formula:

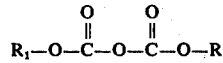

wherein $R_1$ and $R_2$ are each selected from the group consisting of $C_1 - C_{20}$ alkyl, $C_6 - C_{12}$ cycloalkyl, $C_7 - C_{10}$ aralkyl having a single aromatic ring, and $C_6 - C_8$ aryl radicals, the mole ratio of dialkyl pyrocarbonate to acid anhydride being between about 0.1:1 and about 10:1, said acid anhydride, peroxygen compound and pyrocarbonate being present in amounts sufficient to generate, in the presence of said alkaline reagent, an initiating amount of initiator and thereby polymerize the ethylenically unsaturated material.

2. The process of claim 1 wherein the alkaline reagent is selected from the group consisting of alkali metal and alkaline earth metal carbonates and bicarbonates, and quaternary ammonium hydroxides.

3. The process of claim 1 wherein the anhydride is isobutyric anhydride, propionic anhydride, acetic anhydride, pivalic anhydride, or mixtures of such anhydrides.

4. The process of claim 1 wherein the peroxy acid is peracetic acid.

5. The process of claim 1 wherein the ethylenically unsaturated material is vinyl chloride.

6. The process of claim 1 wherein $R_1$ and $R_2$ are the same and are methyl, ethyl, isopropyl, n-butyl, isobutyl, secondary butyl, tertiary butyl, 2-ethylhexyl, cyclohexyl, 4-tertiarybutyl cyclohexyl, phenyl or benzyl.

7. The process of claim 1 wherein from about 0.001 to about 3 weight percent each of organic acid anhydride and dialkyl pyrocarbonate based on ethylenically unsaturated material, is used and the mole ratio of peroxygen compound to the sum of the moles of organic acid anhydride and dialkyl pyrocarbonate is from 0.2:1 to about 10:1 when the peroxygen compound is peroxy acid, and from 0.1:1 to about 10:1 when the peroxygen compound is hydrogen peroxide.

8. The process of claim 7 wherein the mole ratio of peroxygen compound to the sum of the moles of organic acid anhydride and dialkyl pyrocarbonate is about 1:1 when the peroxygen compound is peroxy acid, and from 0.2:1 to about 2:1 when the peroxygen compound is hydrogen peroxide.

9. The process of claim 1 wherein the initiator system contains more than one organic acid anhydride.

10. The process of claim 1 wherein the polymerization is conducted in an aqueous medium.

11. The process of claim 1 wherein the polymerization temperature is from 0° to 95° C.

12. The process of claim 1 wherein the peroxygen compound is a mixture of organic peroxy acid and hydrogen peroxide.

13. In the process for polymerizing ethylenically unsaturated material susceptible to polymerization with free radical type initiators in an aqueous or bulk polymerization medium, the improvement which comprises conducting said polymerization in the presence of an initiator system comprising, in combination,
   a. alkaline reagent,
   b. from 0.01 to about 1 weight percent, based on ethylenically unsaturated material, of organic acid anhydride representable by the general formula:

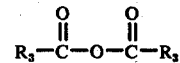

wherein $R_3$ is selected from the group consisting of $C_1 - C_{12}$ alkyl radicals,
   c. hydrogen peroxide, and
   d. from 0.01 to about 1 weight percent, based on ethylenically unsaturated material, of dialkyl pyrocarbonate representable by the formula:

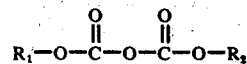

wherein $R_1$ and $R_2$ are each selected from the group consisting of $C_1 - C_{12}$ alkyl, $C_6 - C_{10}$ cycloalkyl, phenyl and benzyl, the mole ratio of dialkyl pyrocarbonate to acid anhydride being between about 0.2:1 and about 1:1, the mole ratio of hydrogen peroxide to the sum of the moles of acid anhydride and dialkyl pyrocarbonate being from 0.2:1 to 2:1, thereby polymerizing the ethylenically unsaturated material.

14. The process of claim 13 wherein the acid anhydride is isobutyric anhydride, propionic anhydride, acetic anhydride, pivalic anhydride, or mixturs of such anhydrides, and the dialkyl pyrocarbonate is dimethyl pyrocarbonate, diethyl pyrocarbonate, di-n-propyl pyrocarbonate, diisopropyl pyrocarbonate, di-n-butyl pyrocarbonate diisobutyl pyrocarbonate, disecondarybutyl pyrocarbonate, ditertiarybutyl pyrocarbonate, di-2-ethylhexyl pyrocarbonate, dicyclohexyl pyrocarbonate, di-4-tertiarybutyl cyclohexyl pyrocarbonate, diphenyl pyrocarbonate, dibenzyl pyrocarbonate, or mixtures of such pyrocarbonates.

15. The process of claim 14 wherein the unsaturated material is vinyl chloride.

16. The process of claim 15 wherein the polymerization is conducted in an aqueous medium and the temperature of the polymerization is from about 20° to about 70° C.

17. The process of claim 15 wherein the alkaline reagent is sodium bicarbonate or quaternary ammonium hydroxide.

18. In the process for polymerizing ethylenically unsaturated material susceptible to polymerization with free radical type initiators in an aqueous or bulk polymerization medium, the improvement which comprises conducting said polymerization in the presence of an initiator system comprising, in combination,
 a. alkaline reagent,
 b. from 0.01 to about 1 weight percent, based on ethylenically unsaturated material, of organic acid anhydride representable by the general formula:

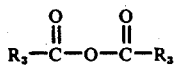

wherein $R_3$ is selected from the group consisting of $C_1 - C_{12}$ alkyl radicals,
 c. organic peroxy acid representable by the general formula:

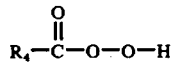

wherein $R_4$ is selected from the group consisting of $C_1 - C_{12}$ alkyl radicals, and
 d. from 0.01 to about 1 weight percent, based on ethylenically unsaturated material, of dialkyl pyrocarbonate representable by the general formula:

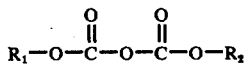

wherein $R_1$ and $R_2$ are each selected from the group consisting of $C_1 - C_{12}$ alkyl radicals, $C_6 - C_{10}$ cycloalkyl, phenyl and benzyl, the mole ratio of dialkyl pyrocarbonate to acid anhydride being between about 0.2:1 and about 1:1, the mole ratio of peroxy acid to the sum of the moles of acid anhydride and dialkyl pyrocarbonate being from about 0.2:1 to about 10:1, thereby polymerizing the ethylenically unsaturated material.

19. The process of claim 18 wherein the acid anhydride is isobutyric anhydride, propionic anhydride, acetic anhydride, pivalic anhydride, or mixtures of such anhydrides, the peroxy acid is peracetic acid and the dialkyl pyrocarbonate is dimethyl pyrocarbonate, diethyl pyrocarbonate, di-n-propyl pyrocarbonate, diisopropyl pyrocarbonate, di-n-butyl pyrocarbonate, diisobutyl pyrocarbonate, disecondarybutyl pyrocarbonate, ditertiarybutyl pyrocarbonate, di-2-ethylhexyl pyrocarbonate, dicyclohexyl pyrocarbonate, di-4-tertiarybutylcyclohexyl pyrocarbonate, diphenyl pyrocarbonate, dibenzyl pyrocarbonate, or mixtures of such pyrocarbonates.

20. The process of claim 19 wherein the mole ratio of peroxy acid to the sum of the moles of acid anhydride and dialkyl pyrocarbonate is about 1:1.

21. The process of claim 14 wherein the polymerization is conducted in an aqueous medium and the temperature of the polymerization is from about 20° to about 70° C.

22. The process of claim 14 wherein the unsaturated material is vinyl chloride.

23. The process of claim 22 wherein the alkaline reagent is sodium bicarbonate or quaternary ammonium hydroxide.

24. In the process for polymerizing vinyl chloride in an aqueous or bulk polymerization medium at temperatures of between about 20° and about 70° C., the improvement which comprises conducting said polymerization in the presence of an initiator system comprising, in combination,
 a. alkaline buffering reagent,
 b. from 0.01 to about 1 weight percent, based on vinyl chloride, of acid anhydride selected from the group isobutyric anhydride, propionic anhydride, acetic anhydride, pivalic anhydride, and mixtures of such anhydrides,
 c. from 0.01 to about 1 weight percent, based on vinyl chloride, of dialkyl pyrocarbonate selected from dimethyl pyrocarbonate, diethyl pyrocarbonate, di-n-propyl pyrocarbonate, diisopropyl pyrocarbonate, di-n-butyl pyrocarbonate, diisobutyl pyrocarbonate, disecondarybutyl pyrocarbonate, ditertiarybutyl pyrocarbonate, di-2-ethylhexyl pyrocarbonate, dicyclohexyl pyrocarbonate, di-4-tertiarybutyl cyclohexyl pyrocarbonate, diphenyl pyrocarbonate, dibenzyl pyrocarbonate, or mixtures of such pyrocarbonates, and
 d. peroxygen compound selected from peracetic acid and hydrogen peroxide,
the mole ratio of dialkyl pyrocarbonate to acid anhydride being between 0.2:1 and 1:1, the mole ratio of peracetic acid and hydrogen peroxide to the sum of the mole of acid anhydride and dialkyl pyrocarbonate between about 1:1 and from 0.2:1 to about 2.0:1 respectively, thereby polymerizing said vinyl chloride.

25. The process of claim 24 wherein the alkaline buffering reagent is selected from alkali metal or alkaline earth metal carbonates and bicarbonates, and quaternary ammonium hydroxides and the amount of alkaline buffering reagent is from about 0.01 to about 10 percent by weight based on vinyl chloride.

26. The process of claim 25 wherein the polymerization is conducted in an aqueous medium.

27. The process of claim 26 wherein the alkaline buffering reagent is sodium bicarbonate, the acid anhydride is isobutyric anhydride, the dialkyl pyrocarbonate is dimethyl pyrocarbonate or diethyl pyrocarbonate, and the peroxygen compound is hydrogen peroxide.

28. The process of claim 23 wherein the peroxygen compound (d) is a mixture of peracetic acid and hydrogen peroxide.

* * * * *

UNITED STATES PATENT AND TRADEMARK OFFICE
CERTIFICATE OF CORRECTION

PATENT NO. : 3,985,720
DATED : October 12, 1976
INVENTOR(S) : James A. Manner

It is certified that error appears in the above-identified patent and that said Letters Patent are hereby corrected as shown below:

Column 22, line 8, "14" should be --19--.

Column 22, line 12, "14" should be --19--.

Column 22, line 61, "23" should be --24--.

Signed and Sealed this

Twenty-first Day of December 1976

[SEAL]

Attest:

RUTH C. MASON
*Attesting Officer*

C. MARSHALL DANN
*Commissioner of Patents and Trademarks*